US012619846B2

(12) United States Patent
Dai et al.

(10) Patent No.: US 12,619,846 B2
(45) Date of Patent: May 5, 2026

(54) RFID YARN MODULE AND METHOD FOR MAKING THE SAME

(71) Applicant: Securitag Assembly Group Co., Ltd., Taichung (TW)

(72) Inventors: Chong En Dai, Taichung (TW); Cheng Hung Chang, Taichung (TW)

(73) Assignee: Securitag Assembly Group Co., Ltd., Taichung (TW)

( * ) Notice: Subject to any disclaimer, the term of this patent is extended or adjusted under 35 U.S.C. 154(b) by 0 days.

(21) Appl. No.: 19/207,948

(22) Filed: May 14, 2025

(65) Prior Publication Data

US 2025/0272528 A1     Aug. 28, 2025

Related U.S. Application Data

(62) Division of application No. 17/966,586, filed on Oct. 14, 2022, now Pat. No. 12,361,246.

(30) Foreign Application Priority Data

Jul. 4, 2022     (TW) .................................. 111124965

(51) Int. Cl.
| | |
|---|---|
| *G06K 19/077* | (2006.01) |
| *G06K 19/02* | (2006.01) |
| *G06K 19/07* | (2006.01) |

(52) U.S. Cl.
CPC ....... *G06K 19/027* (2013.01); *G06K 19/0723* (2013.01); *G06K 19/07718* (2013.01); *G06K 19/07722* (2013.01)

(58) Field of Classification Search
CPC ............. G06K 19/027; G06K 19/0723; G06K 19/07718; G06K 19/07722

USPC .......................................................... 235/492
See application file for complete search history.

(56) References Cited

U.S. PATENT DOCUMENTS

| | | | | |
|---|---|---|---|---|
| 2005/0173541 A1* | 8/2005 | Inoue | ............... | G06K 19/07728 |
| | | | | 235/492 |
| 2015/0339564 A1* | 11/2015 | Herslow | ................... | B32B 3/14 |
| | | | | 156/60 |
| 2016/0148086 A1* | 5/2016 | Clarke | ................. | G06K 19/027 |
| | | | | 235/492 |

(Continued)

FOREIGN PATENT DOCUMENTS

EP          3610416 B1 *  2/2022  ........... G06K 19/077

*Primary Examiner* — Michael G Lee
*Assistant Examiner* — David Tardif
(74) *Attorney, Agent, or Firm* — Chen Yoshimura LLP

(57) ABSTRACT

The present invention provides an RFID yarn module comprising a polymer substrate having a first surface and a second surface opposite to the first surface, a metal layer, and a first adhesive layer formed on the metal layer, and a first polymer material layer formed on the first the adhesive layer, a second adhesive layer, and a first protection layer. The metal layer is formed on the first surface of the polymer substrate and has an RFID element electrically connected to the metal layer. The second adhesive layer is formed on the first polymer material layer and is corresponding to the RFID element. The first protection layer is formed on the second adhesive layer. Alternatively, the present invention provides a method for making the RFID yarn module in which a roll-to-roll process for mass manufacturing is utilized to make the RFID yarn module.

6 Claims, 14 Drawing Sheets

(56)  References Cited

U.S. PATENT DOCUMENTS

2020/0003931  A1 *  1/2020  Dunn ........................ F16L 1/11
2020/0117965  A1 *  4/2020  Drossaert ............. G06K 19/027
2023/0048347  A1 *  2/2023  Forster .................... H01Q 1/38

* cited by examiner

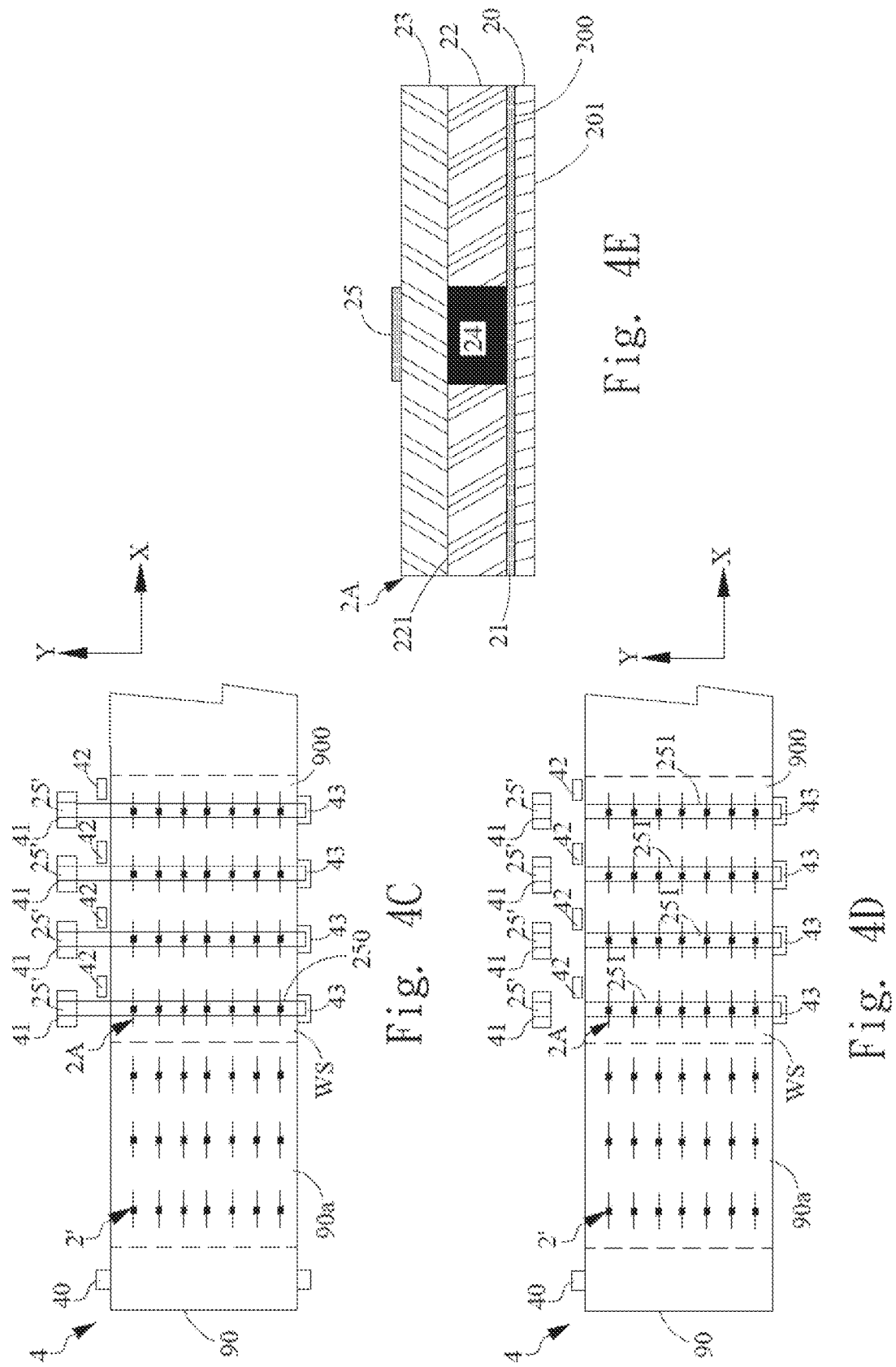

RFID YARN MODULE AND METHOD FOR MAKING THE SAME

This application claims the benefit of Taiwan Patent Application Serial No. 111124965, filed Jul. 4, 2022, the subject matter of which is incorporated herein by reference.

BACKGROUND OF INVENTION

1. Field of the Invention

The present invention is related to a wireless communication technology, and more particularly, to an RFID (radio-frequency identification) yarn module and method for making the same.

2. Description of the Prior Art

RFID tags have already been adapted in different kinds of industrial fields. In the recent years, the RFID tags are also induced into the retail management so as to considerably increase benefits in the retail industry and obviously affect the operation in the retail business of clothing and footwear. Since the requirement of RFID tags in different industrial fields drive the research and design of the RFID tags, the cost for making the RFID tag is also consequently reduced such that the RFID tags can be broadly adopted.

Recently, the RFID tags for management of supply chain can be divided into two fields in which the sticker type RFID tags are mainly utilized for logistics management while the paper-made hang type RFID tags are mainly utilized in retail management. Either the sticker type or hang type RFID tag belongs to disposable RFID tag. Moreover, the sticker type or hang type RFID tags are not waterproof and they are easy to be eliminated or misplaced. In addition, the sticker type or hang type RFID tags will also cause environmental issues when the sticker or hang tag are disposed of. Since the RFID tags are easily interfered with by static electricity, metal environment, and water, the operating environment where the RFID tags could be utilized are strongly limited. Currently, the commonly used types of the RFID tags can be sticker type, paper-made hang type, cards, button-type elements, or ring-shaped type, and so on, which are mostly made from polymer materials, such as silicon gel, ABS (acrylonitrile butadiene styrene), PVC (polyvinyl chloride), PETG (polyethylene terephthalate glycol-modified), PC (polycarbonates), and PP (polypropylene). The products of RFID tags made by above-mentioned conventional ways are mostly saturated.

Conventionally, the RFID tag cannot be washed. Even if there has been washable RFID tag, it still has drawbacks of bulky and causing the wear and tear of weaving object as well. In the conventional art, although there have been RFID products wrapped by yarn-woven fabric, these products are not water proof. For example, the RFID element in the RFID tag will be damaged after washing a few times. Accordingly, there is a need for providing an RFID yarn module and method for making the same for solving the problem occurred in the conventional RFID tag.

SUMMARY OF THE INVENTION

The present invention provides an RFID yarn module and method for making the same in which the volume of the antenna layout is minimized and highly stable package of the antenna and RFID element is achieved through a specific packaging technique described hereinafter. After packaging the antenna, a cover plate is formed on the position corresponding to the RFID element electrically connected to the antenna to function as a protection layer for protecting the RFID element thereby the capability of durable for laundry of the present RFID yarn module is greatly improved. In another embodiment, plural columns of the protection layers are simultaneously adhered on the material band having a plurality of RFID tags formed thereon. After that, the material band having the protection layer formed thereon are divided into a plurality of first cut band having a first width and the first cut bands are subsequently divided into a plurality of second cut band having a second width. Thereafter, the yarns are woven to wrap the second cut band. Finally, a tiny, concealable, and flexible RFID yarn module can be formed through a cutting process. The manufacturing process is conducted by a roll-to-roll process.

In one embodiment, the present invention provides an RFID yarn module comprising a polymer substrate, a metal layer, a first adhesive layer, a first polymer layer, a second adhesive layer, and a first protection layer. The polymer substrate is configured to have a first surface and a second surface opposite to the first surface. The metal layer is formed on the first surface of the polymer substrate, the metal layer further electrically connected to an RFID element which is disposed on the metal layer. The first adhesive layer is formed on the metal layer and surrounding the RFID element. The first polymer layer is formed on the first adhesive layer and the RFID element. The second adhesive layer is formed on the first polymer layer and spatially corresponding to the RFID element. The first protection layer is formed on the second adhesive layer.

In another embodiment, the present invention further provides a method for making the RFID yarn module comprising steps of providing a roll-to-roll equipment having a material roll arranged thereon, wherein the material roll comprises a plurality of RFID tags two-dimensionally formed on the material roll. Each RFID tag comprises a polymer substrate, a metal layer, an RFID element, a first adhesive layer and a first polymer layer. The polymer substrate has a first surface and a second surface opposite to the first surface, a metal layer formed on the first surface of the polymer substrate and electrically connected to the RFID element which is disposed on the metal layer, a first adhesive layer formed on the metal layer and surrounds the RFID element, and a first polymer layer formed on the first adhesive layer and the RFID element, moving a material band segment having M×N RFID tags to a processing station along a first direction, forming a quantity M of protection layers on the first polymer layer formed on the M×N RFID tags at the processing station along a second direction perpendicular to the first direction, moving the material band segment having the quantity M of the protection layers to a cutting station, and cutting the material band segment having the quantity M of the protection layers along the first direction thereby forming a quantity N of RFID tag bands.

BRIEF DESCRIPTION OF THE DRAWINGS

The present invention will now be specified with reference to its preferred embodiment illustrated in the drawings, in which:

FIGS. 4A~4J illustrate each station of roll-to-roll equipment for making the RFID yarn module of the present invention.

DESCRIPTION OF THE PREFERRED EMBODIMENT

The invention disclosed herein is directed to an RFID yarn module and method for making the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
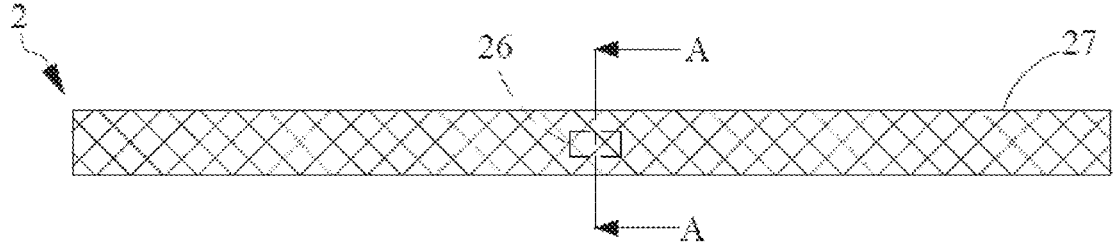
FIG. 1A illustrates a top view of an RFID yarn module according to one embodiment of the present invention.
Figure 1B:
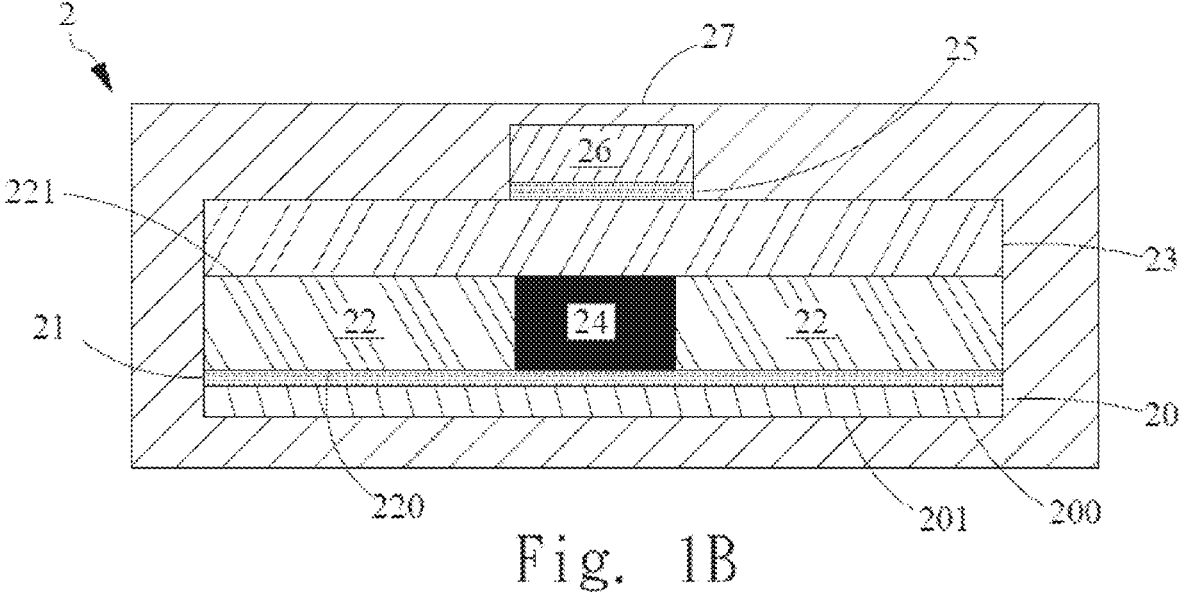
FIG. 1B illustrates an AA cross sectional view of the RFID yarn module shown in FIG. 1A.

Please refer to FIGS. 1A and 1B, in which FIG. 1A illustrates a top view of RFID yarn module according to one embodiment of the present invention while FIG. 1B illustrates an AA cross-sectional view of the RFID yarn module shown in FIG. 1A. In the present embodiment, the RFID yarn module 2 comprises a polymer substrate 20, a metal layer 21, a first adhesive layer 22, a first polymer layer 23, a second adhesive layer 25 and a first protection layer 26. The polymer substrate 20, in one embodiment, is a flexible substrate formed by polymer material, such as polyethylene terephthalate (PET), for example. It is noted that the polymer material is not limited to the PET in the present embodiment. The polymer substrate 20 comprises a first surface 200, and a second surface 201 opposite to the first surface 200. In one embodiment, the thickness of the polymer substrate 20 is 0.05 mm. It is noted that the thickness 0.05 mm is an exemplary embodiment and it is not limited thereof.

The metal layer 21 is formed on the first surface 200 of the polymer substrate 20 and an RFID element 24 is disposed on and electrically connected to the metal layer 21. In one embodiment, the RFID element 24 has two electrical terminals electrically connected to the two separated electrical terminals through a hot-pressed electrically conductive adhesive. In the present embodiment, the metal layer can be, but should not be limited to, gold, silver, copper or aluminum. In the present embodiment, an antenna pattern is formed on the metal layer 21, which is well known by the one having ordinary skilled in the art and it will not be further described hereinafter. In the present embodiment, the metal layer 21 is made of aluminum foil having thickness 0.009 mm. It is noted that this thickness is just an exemplary embodiment and it is not the limitation of the present invention. The RFID element 24 further has a capability of wireless communication for receiving, transmitting, or storing the information in the radio frequency signal. The RFID element 24 is a well-known element, which is not described in detail hereinafter.

Figure 1C:
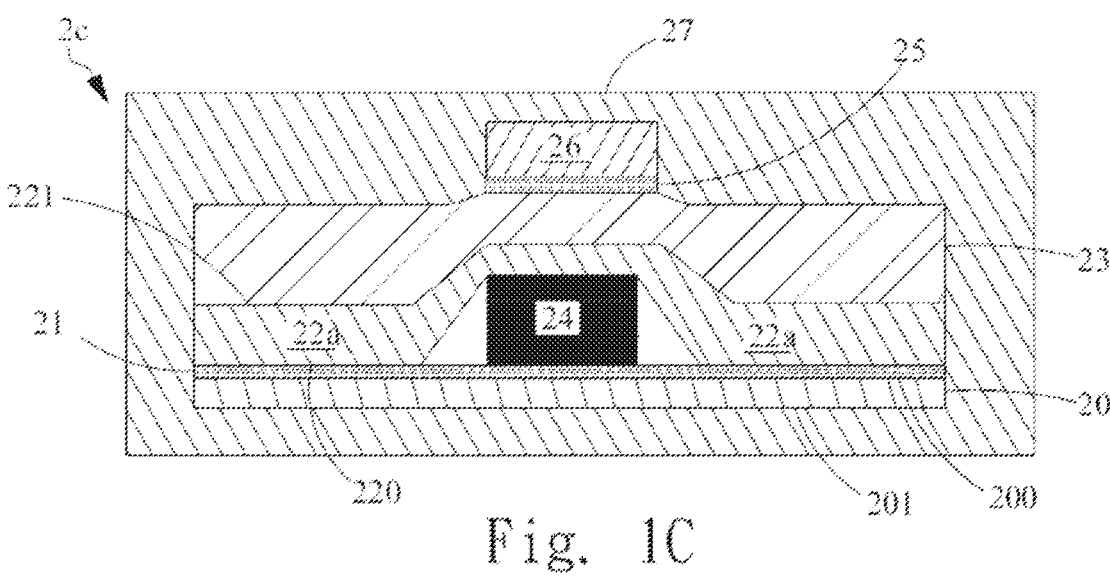
FIG. 1C illustrates an AA cross sectional view according to another embodiment of the RFID yarn module of the present invention.

In the embodiment shown in FIG. 1B, the first adhesive layer 22 is formed on the metal layer 21 and disposed around the RFID element 24. Alternatively, please refer to FIG. 1C, the first adhesive layer 22a of the RFID yarn module 2c is directly covered onto the RFID element 24 and the metal layer 21. The ways shown in FIG. 1B and FIG. 1C are the possible way for forming the first adhesive layer 22 on the metal layer 21 and the RFID element 24. Referring back to the FIG. 1B, the first adhesive layer 22, in the present embodiment is a double-sided adhesive having a first adhesive surface 220 adhering to the metal layer 21 and a second adhesive surface 221. In the present embodiment, the thickness of the first adhesive layer is around 0.13 mm, which is an exemplary example of the present invention and it will not be a limitation of the present invention. The first polymer layer 23 is formed on the second adhesive surface 221 of the adhesive layer 22 and the RFID element 24. In the present embodiment, the first polymer layer 23 is a flexible material which can be, but should not be limited to, the PET material. In the present embodiment, the thickness of the first polymer layer 23 is 0.1 mm, which is an exemplary example of the present invention and it will not be a limitation of the present invention. Alternatively, please refer to the FIG. 1C, the first polymer layer 23 is directly formed on the second adhesive surface 221 of the adhesive layer 22.

Referring back to FIG. 1B, the second adhesive layer 25 is formed on the first polymer layer 23 and is spatially corresponding to the RFID elements 24. The second adhesive layer 25, in the present embodiment, is a double-sided adhesive band having one surface adhering to the first polymer layer 23. In one embodiment, the thickness of the second adhesive layer 25 is 0.1 mm. It is noted that the thickness 0.1 mm is only an exemplary embodiment, and it is not limited to the 0.1 mm. The first protection layer 26 is adhered to the second adhesive layer 25. The first protection layer 26 can be, but should not limited to, PET material, and the thickness, in one embodiment, can be, but should not limited to, 0.1 mm. The RFID yarn module 2 further comprises a yarn-woven layer 27 wrapped around the outer surface of the RFID module, which is formed by the RFID element 24 together with the polymer substrate 20, the metal layer 21, the first adhesive layer 22, the first polymer layer 23, the second adhesive layer 25, and the protection layer 26. In one embodiment, yarns are woven to form a fabric wrapping around the RFID module. It is noted that since there is a protection layer 26 formed corresponding to the location where the RFID element is formed, the RFID yarn module 2 can be durable for washing process whereby it can prevent the RFID element 24 from being damaged even if the RFID yarn module 2 is washed several times thereby increasing the lifetime of the RFID yarn module 2.

Figure 2:
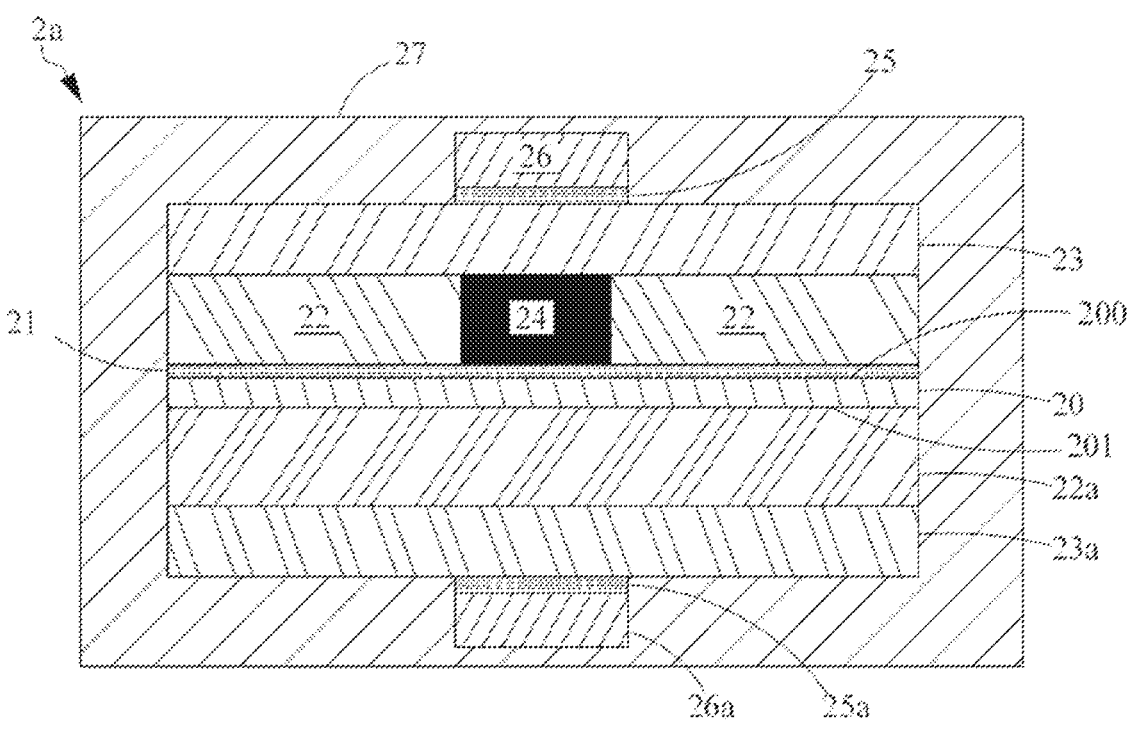
FIG. 2 illustrates an RFID yarn module according to another embodiment of the present invention.

Please refer to FIG. 2, which illustrates an RFID yarn module according to another embodiment of the present invention. In the present embodiment, the RFID yarn module 2a is similar to the RFID yarn module 2 shown previously, the different part including that the RFID yarn module 2a further comprises a third adhesive layer 22a, a second polymer layer 23a, a fourth adhesive layer 25a, and a second protection layer 26a. The third adhesive layer 22a is formed on the second surface 201 of the polymer substrate 20. In the present embodiment, the third adhesive layer 22a is a double-sided adhesive having one surface adhered to the second surface 201, and the other opposite surface is adhered to the second polymer surface 23a. The fourth adhesive layer 25a is formed on the second polymer layer 23*a* and is spatially corresponding to the RFID element 24. The second protection layer 26*a* is formed on the fourth adhesive layer 25*a*.

In the present embodiment, the material for forming the third adhesive layer 22*a* is the same as the first adhesive layer 22, the material for forming the second polymer layer 23*a* is the same as the first polymer layer 23, the material for forming the fourth adhesive layer 25*a* is the same as the second adhesive layer 25, and the material for forming the second protection layer 26*a* is the same as the first protection layer 26 and the characteristic of the each material will not be described hereinafter. It is noted that since the top and bottom sides of the RFID yarn module 2*a* respectively have the first protection layer 26 and the second protection layer 26*a* respectively formed corresponding to the location where the RFID element is formed, the RFID yarn module 2*a* can be durable for washing process whereby it can prevent the RFID element 24 from being damaged even if the RFID yarn module 2*a* is washed several times thereby increasing the lifetime of the RFID yarn module 2*a*.

Figure 3:
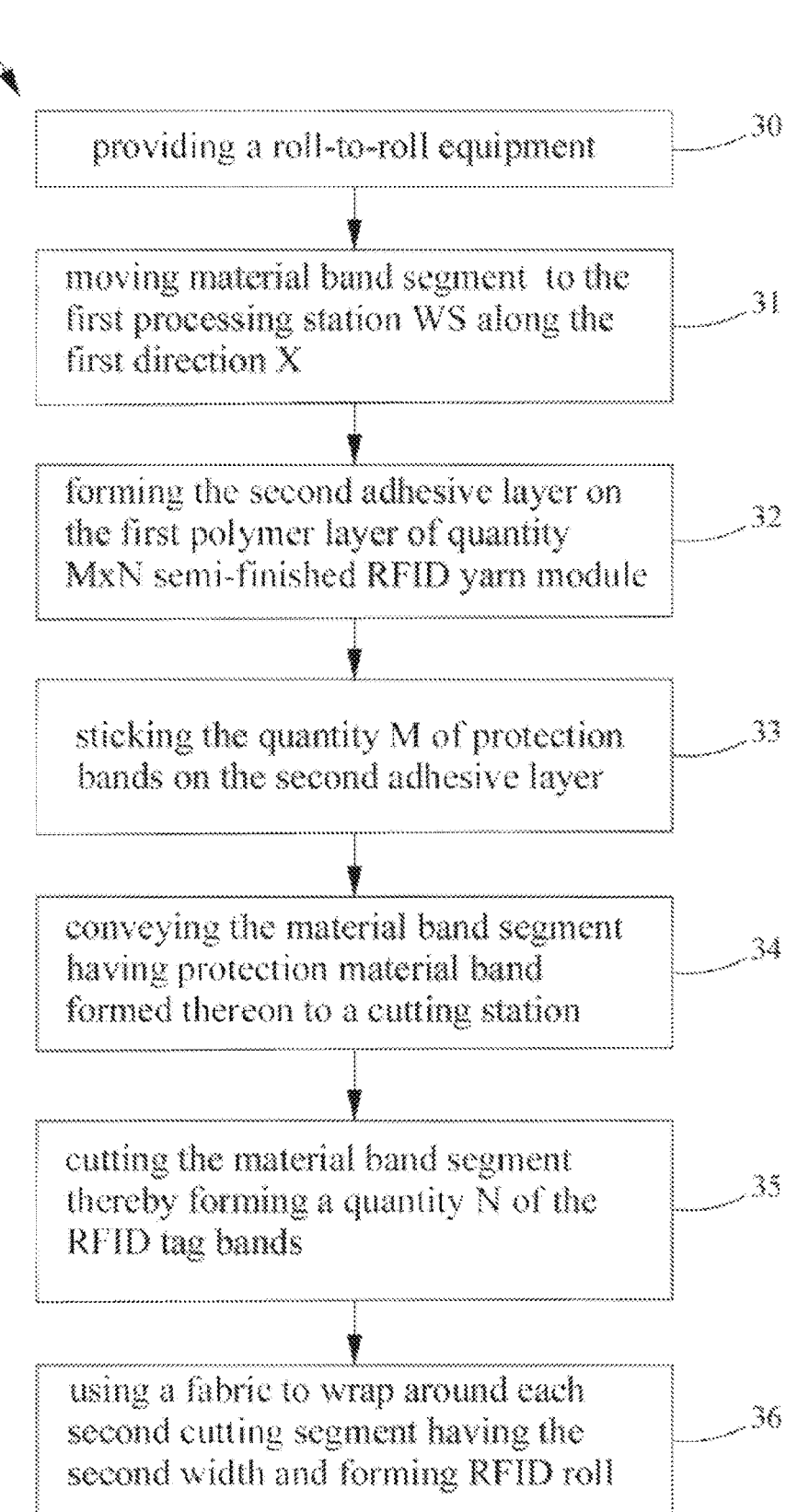
FIG. 3 illustrates a manufacturing flow according to one embodiment for making the RFID yarn module of the present invention.
Figures 4A, 4B:
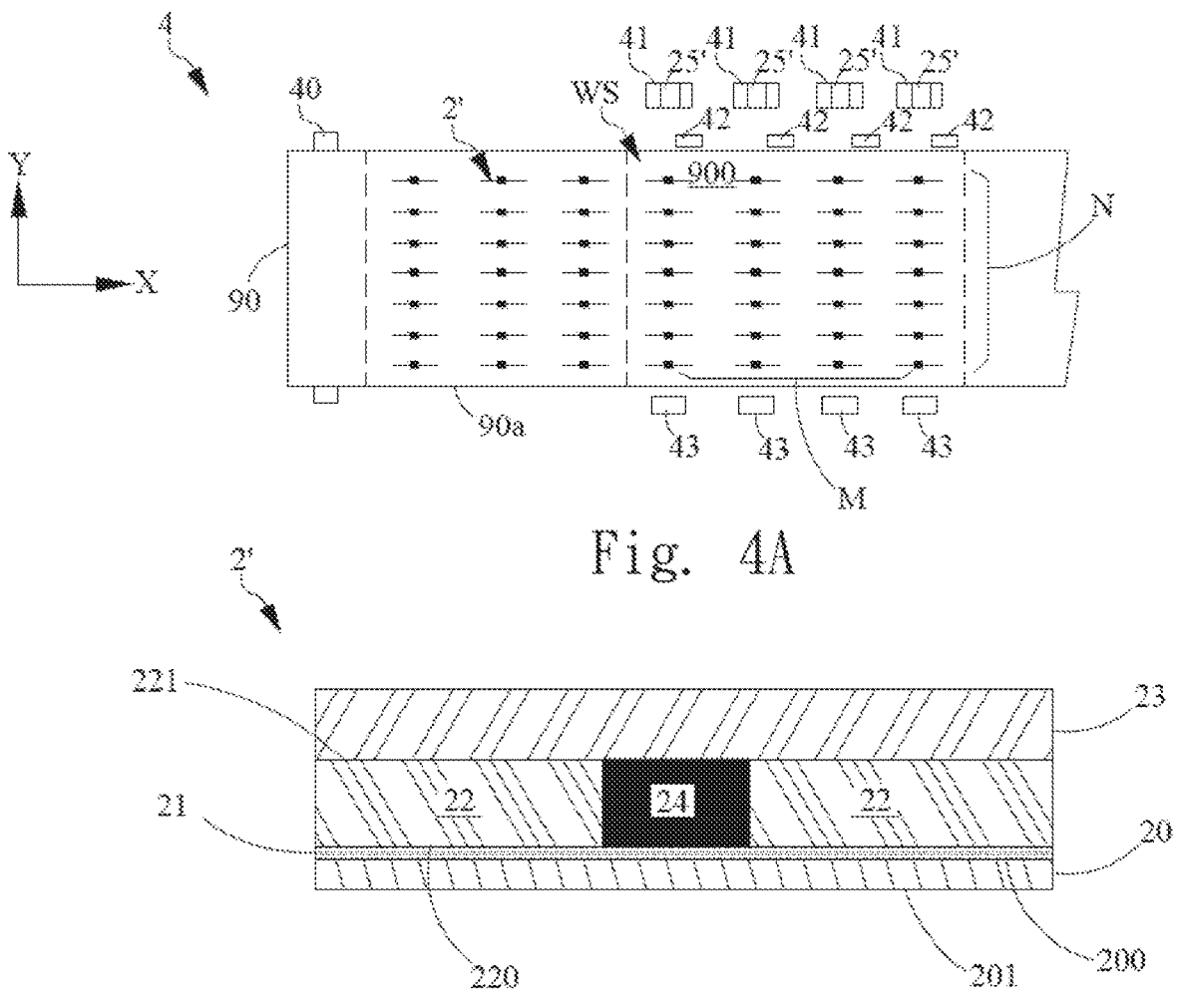

Please refer to FIG. 3, which illustrates a manufacturing flow of the RFID yarn module according to one embodiment, of the present invention. The RFID yarn module 2 in the present embodiment is taken as an exemplary example for explaining the manufacturing process. The manufacturing process 3 comprises the following steps. At first, a step 30 is performed for providing a roll-to-roll equipment. In one embodiment shown in FIG. 4A, the roll-to-roll equipment 4 comprises a main roller 40 having a material roll 90 rotatably arranged on the main roller 40. The material roll 90 is formed by rolling the material band 90*a*. In the present embodiment, a material band 90*a* of the material roll 90 is transported toward the first direction X. As shown in FIGS. 4A-4B, the material band 90*a* comprises two-dimensionally arranged first semi-finished RFID yarn module 2' each of which constitutes the parts of the RFID yarn module 2 shown in FIG. 1B, and comprises a polymer substrate 20, a metal layer 21, a first adhesive layer 22 and a first polymer layer 23, wherein the polymer substrate 20 has a first surface 200 and a second surface 201 opposite to the first surface 200, the metal layer 21 is formed on the first surface 200 of the polymer substrate 20 and is electrically connected to the RFID element 24, the RFID element 24 is disposed on the metal layer 21, the first adhesive layer 22 is formed on the metal layer 21 and surrounds the RFID element 24, the first polymer layer 23 is formed on the first adhesive layer 22. Alternatively, the metal layer 21, the first adhesive layer 22*a* and the first polymer layer 23 can also be the first semi-finished RFID yarn modules 2' shown in FIG. 4A. In the present embodiment, the material band 90*a* is a polymer material that formed the polymer substrate 20. The polymer substrate 20, metal layer 21, first adhesive layer 22 and first polymer layer 23 of adjoining first semi-finished RFID yarn modules 2' are continuous across the entire extent of the material band 90*a*, and the collection of these layers along with the RFID elements 24 constitute the material band 90*a*. The mechanical characteristic of the material band 90*a* is primarily determined by that of the polymer substrate 20.

Please refer back to the FIG. 3. After step 30, the step 31 is performed to move a part of material band 90*a*, i.e. material band segment 900 hereinafter, to the first processing station WS along the first direction X. Please refer to FIG. 4A. The material band segment 900 has a quantity of M×N first semi-finished RFID yarn modules 2' in which quantity M of first semi-finished RFID yarn modules 2' are evenly distributed and equally spaced along the first direction X, and quantity N first semi-finished RFID yarn modules 2' are evenly distributed and equally spaced along the second direction Y.

After the material band segment 900 is moved to the processing station WS, a step 32 is performed to form the second adhesive layer on the first polymer layer of quantity M×N of first semi-finished RFID yarn module 2'. Please refer to FIGS. 4C-4D, which illustrate the detail for performing the step 32. The roll-to-roll equipment 4 moved the material band segment 900 having quantity M×N of first semi-finished yarn modules 2' to the processing station WS. In the processing station WS, the equipment 4 further comprises a plurality of rollers 41, a cutter 42 and clamping device 43. Each roller 41 has an adhesive material roll 25' which is a double-sided adhesive material roll arranged on the roller 41. The adhesive material roll 25' can be rotated through the rotation of roller 41. In the present embodiment the quantity of the roller 41 is M corresponding to the quantity of first semi-finished RFID yarn module 2' arranged on the material band segment 900 along the first direction X. The cutter 42 is operated to cut the adhesive material band pulled from the adhesive material roll 25'. The clamping devices 43 are arranged corresponding to the adhesive material rolls 25' arranged on each roller 41. Each clamping device 43 can clamp a free end of adhesive material band 250 from the corresponding adhesive material roll 25' and move along the second direction Y thereby pulling adhesive material band 250 to the location corresponding to the quantity N of first semi-finished RFID yarn module 2'. Each pulled adhesive material band 250 is adhered to the area corresponding to the RFID elements 24 formed on the material band segment 900. After that, as the illustration shown in FIG. 4D, the cutter 42 is moved along the X direction to cut the adhesive material band 250 thereby forming a plurality of adhesive material band segment 251 on the material band segment 900 such that the plurality of M×N second semi-finished RFID yarn modules 2A can be formed on the material band segment 900. Since the adhesive material band segment 251 is a double-sided adhesive material, the adhesive material band segment 251 functions as the second adhesive layer 25 for second semi-finished RFID yarn module 2A. The cross-sectional view of each second semi-finished RFID yarn module 2A is illustrated in the FIG. 4E.

Figures 4F, 4G, 4H:
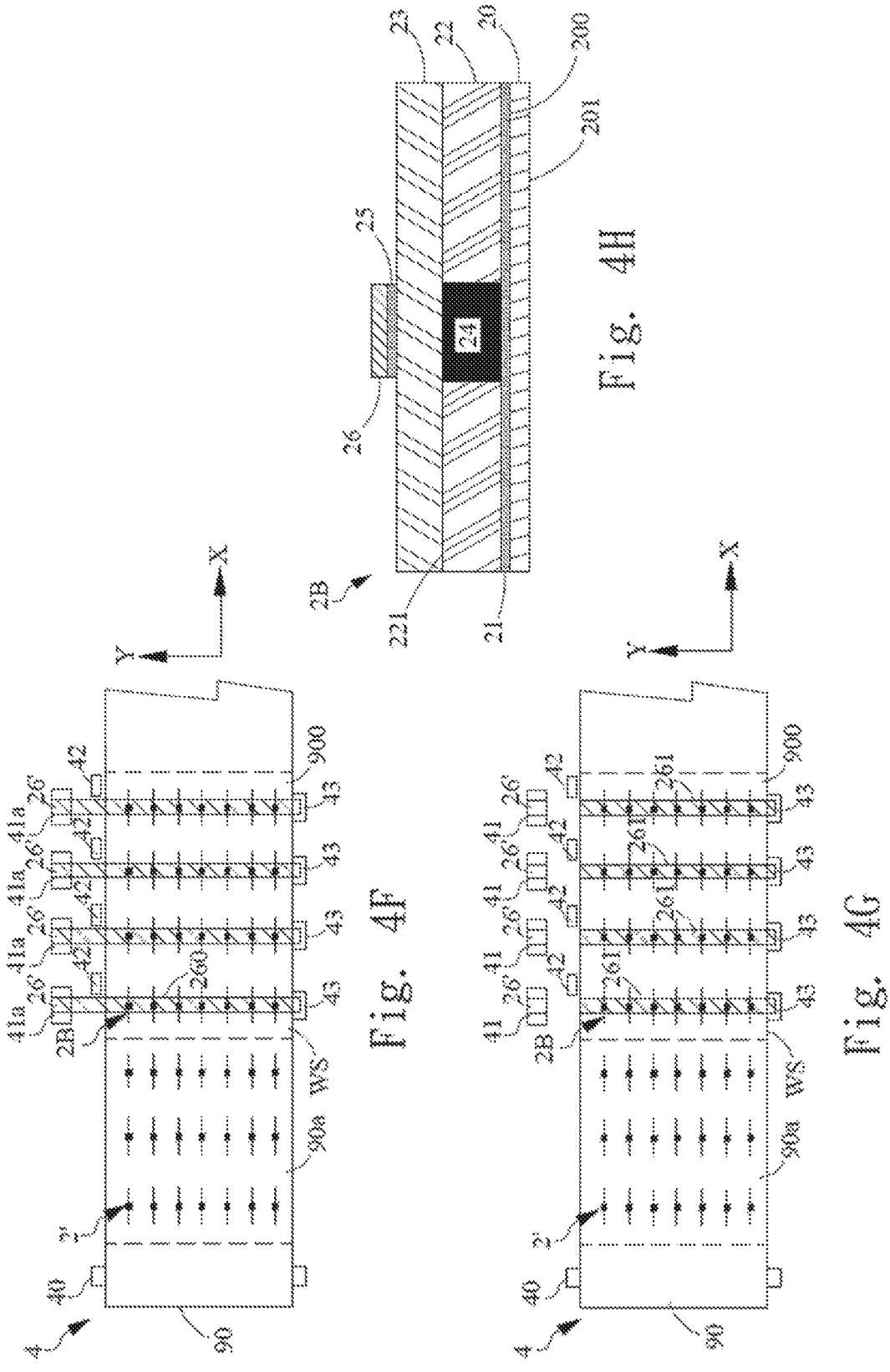
Figure 41:
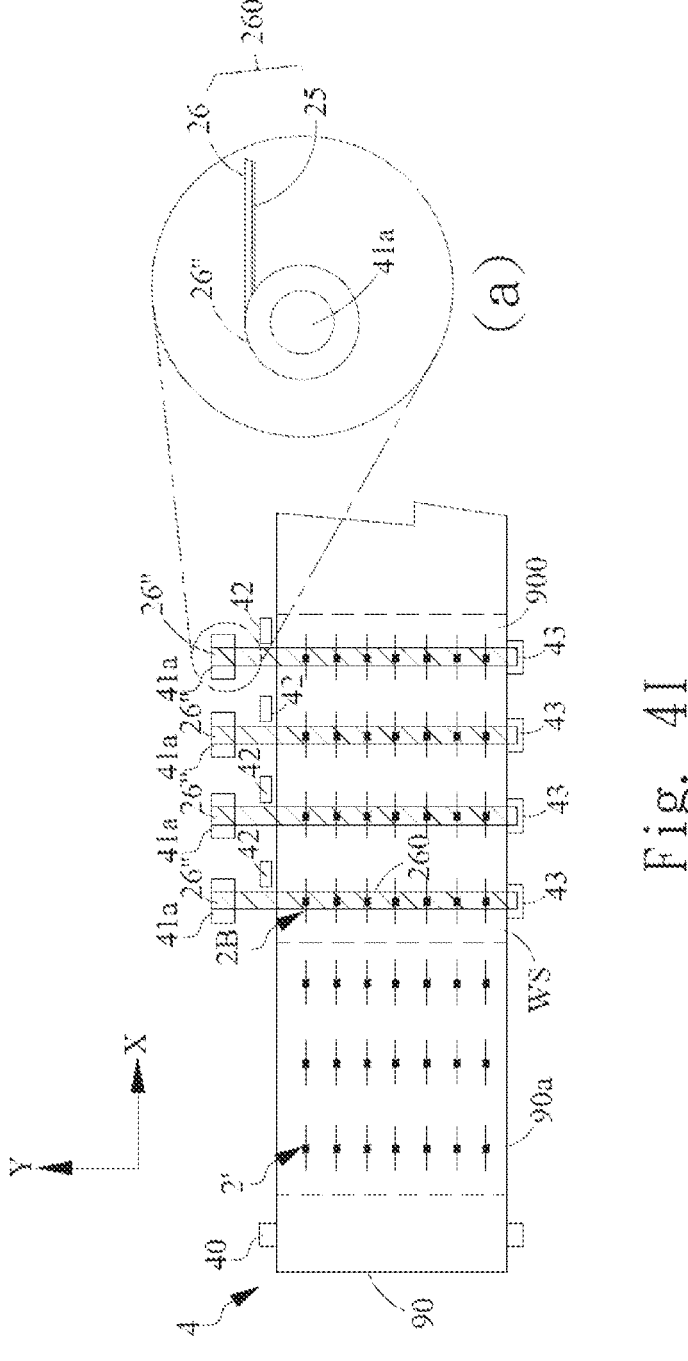

Thereafter, a step 33 is performed to stick the quantity M of protection bands on the second adhesive layer. In one embodiment of the step 33, which is illustrated in FIGS. 4F-4H, it is similar to the step 32. In the processing station WS, protection layer is formed on each second semi-finished RFID yarn module 2A. In one embodiment, another roller set having quantity M of the rollers 41*a* is moved to the lateral side of the material band segment 900. Each roller 41*a* has protection material roll 26' arranged thereon. The cutter 42 is utilized to cut the protection material pulled from the protection material roll 26'. Each clamping device 42 is corresponding to each protection material roll 26' and can pull the protection material band 260 along the second direction Y. In the present embodiment, as shown in FIG. 4F, each clamping device 43 clamps a free end of each protection material roll 26' and moved along the second direction −Y. The pulled protection material band 260 from the protection material roll 26' is adhered to second adhesive layer 25 corresponding to the area having the RFID elements. After that, as shown in FIG. 4G, the cutter 42 moves along the X direction to cut the protection material band 260 whereby a plurality M×N of the third semi-finished RFID yarn module 2B are formed and the cross-section view of each third semi-finished RFID yarn module 2B is shown as FIG. 4H in which the cut protection material band 260 functions as the protection layer 26 for each third semi-finished RFID yarn module 2B. It is noted that although the step 32 and step 33 are performed in the same processing station WS, alternatively, the step 32 and step 33 can be performed in different processing station, i.e. the processing station of step 33 is subsequently arranged after the process station of step 32.

In addition to the steps shown in FIGS. 4E~4H, in another embodiment shown in FIG. 4I, different form the previously described embodiment, the protection material band 260 having the second adhesive layer 25 formed thereon is directly adhered to the area corresponding to the RFID elements formed on the material band segment 900. The roller 41a has the protection material roll 26". The free end of the protection material roll 26' is clamped by the clamping device 43, and is pulled by the clamping device 43 moving toward the second direction-Y. After the protection material band 26" is pulled a specific length, the protection material band 260 is directly adhered to the material band segment 900 through the second adhesive layer 25 formed thereon. In the present embodiment, as shown in FIG. 4I in the enlarged portion (a), the pulled protection material band 260 comprises the first protection layer 26 and the second adhesive layer 25 so that when the protection material band 260 is adhered on the material band segment 900 and is cut by the cutter 42 moving along the first direction X, the protection layer 26 can be directly formed through the second adhesive layer 25 adhered to the material band segment 900.

Figure 4J:
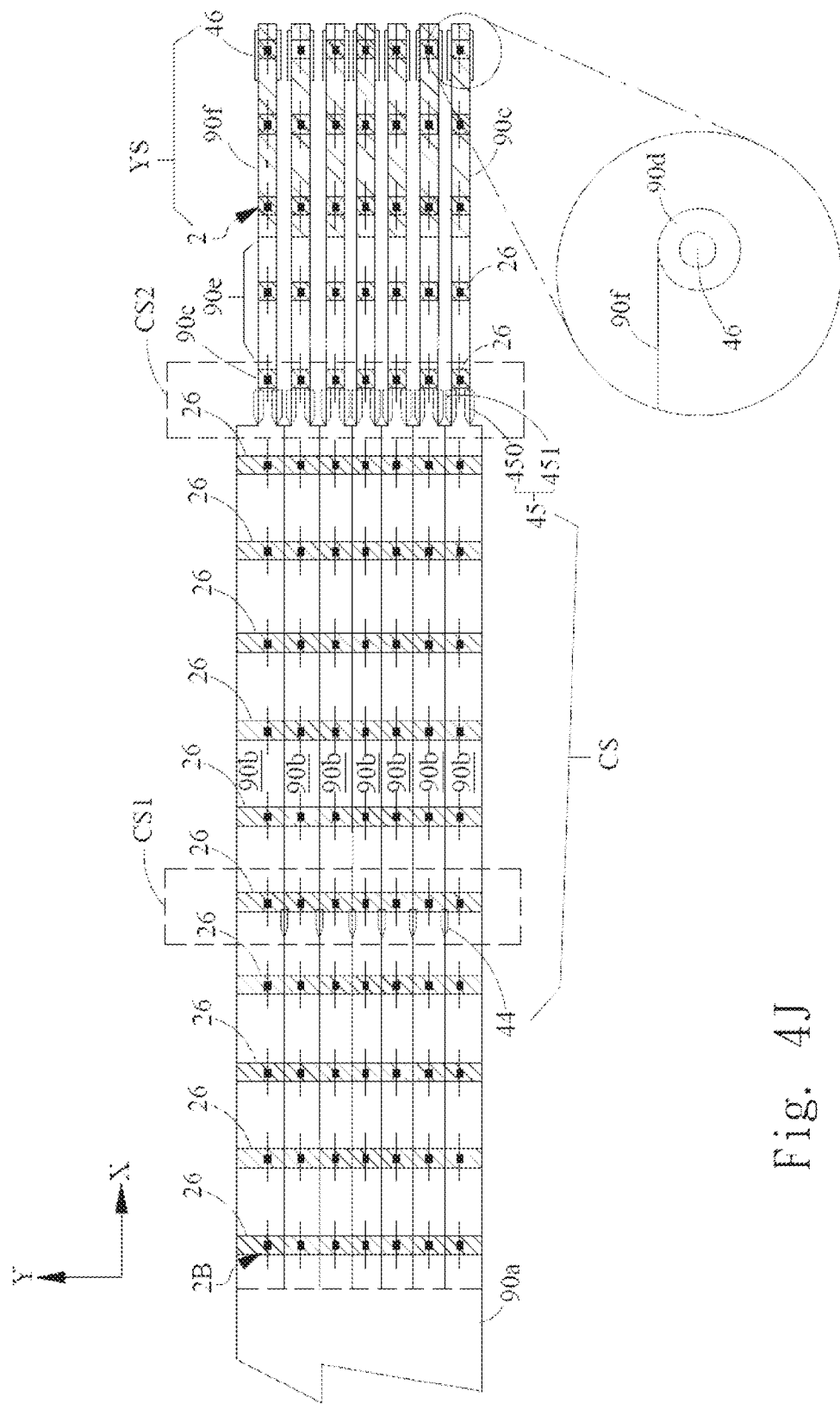

After the step 33, the step 34 is performed to convey the material band segment 900 having protection material band formed thereon to a cutting station. Please refer to FIG. 4J, in the present embodiment, the cutting station CS further comprises a first cutting stage CS1 and a second cutting stage CS2. The first cutting stage CS1 comprises quantity N−1 of first cutters 44 equally spaced along the second direction Y, each cutting along the first direction X. In the second cutting stage CS2, a quantity N−1 of second cutters 45 are equally spaced along the second direction Y, wherein each second cutter 45 has a pair of cutting tools 450 and 451 spaced apart from each other, each cutting along the first direction X. The distance between the pair of cutting tools determines a final width of the RFID yarn module.

After the material band segment 900 is conveyed to the cutting station CS, a step 35 is performed to cut the material band segment 900 thereby forming a quantity N of the RFID tag bands. In the present step shown in FIG. 4J, the cutting step further comprises a first stage of utilizing a quantity N−1 of first cutters 44 to cut the material band segment 900 at the first cutting stage CS1 thereby forming a quantity N of first cutting segments respectively having a first width. In this first cutting stage, it is a stage to perform a roughly cutting process so as to form the quantity N of the first cutting segments 90b. After that, the quantity N of the first cutting segments 90b is conveyed to the second cutting stage CS2 having a quantity N of the second cutters 45 for finely cutting each corresponding first cutting segment 90b thereby forming a quantity N of the second cutting segment 90c respectively having a second width which is determined according to the user's need. Thereafter, the second cutting segment 90c forms the RFID tag band 90e is processed by the step 36. In step 36, it is performed to convey the quantity N of the RFID tag band 90e to a weaving station YS, in which yarns are woven into a fabric which wraps around each RFID tag band 90e thereby forming a quantity N of the RFID yarn module band 90f. Each RFID yarn module band 90f is rolled by the roller 46 subsequently thereby forming a quantity N of the RFID tag rolls 90d, each of which contains a plurality of sequentially arranged RFID yarn module 2.

Figure 5A:
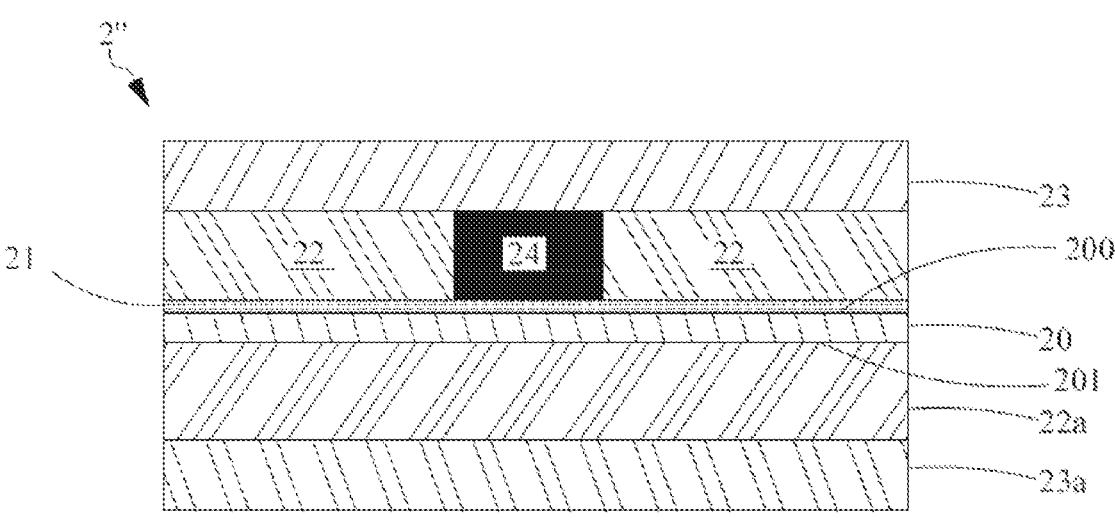
FIGS. 5A~5D respectively illustrate embodiments of semi-finished RFID yarn module in different processing step.

It is noted that although in the embodiment shown in FIGS. 4A~4J is illustrated steps for forming the RFID yarn module shown in FIG. 1B or FIG. 1C, the steps for forming the RFID yarn module 2a shown in FIG. 2 is almost the same as the previously described and illustrated steps. In one embodiment, in the step shown in FIG. 4A, the semi-finished RFID yarn module 2' formed on the material band 90a is illustrated as FIG. 5A, comprises a part of a polymer substrate 20, a metal layer 21, first adhesive layer 22, the third adhesive layer 22a, first polymer layer 23, second polymer layer 23a, and RFID element 24. In addition, in FIGS. 4C~4D and 4F~4G, there are two sets of rollers 41 and 4a, cutters 42 and clamping devices 43 respectively for forming the second adhesive layers 25 and the first protection layer 26 on the top surface of the material band 90a and forming the fourth adhesive layer 25a, and the second protection layer 26a forming on the bottom surface of the material band 90a simultaneously.

Figure 4K:
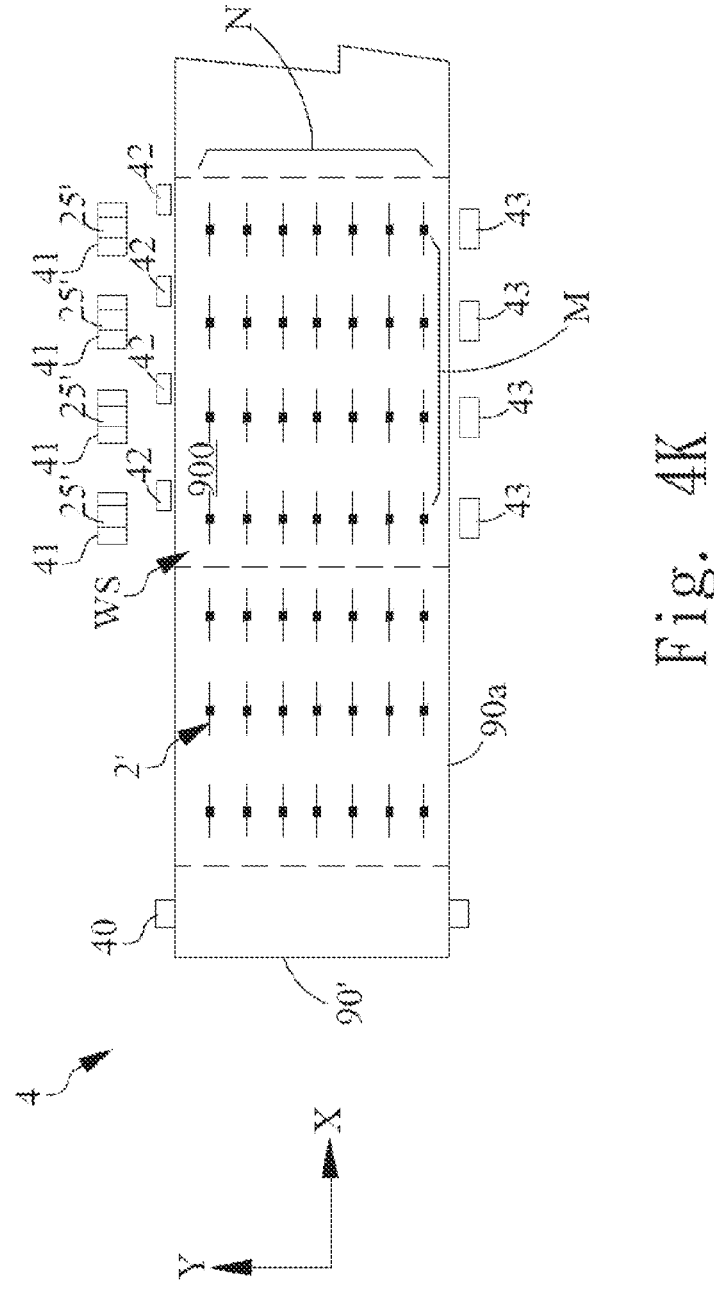
FIGS. 4K~4P illustrates a flow form making the RFID yarn module shown in FIG. 2.
Figures 4L, 4M:
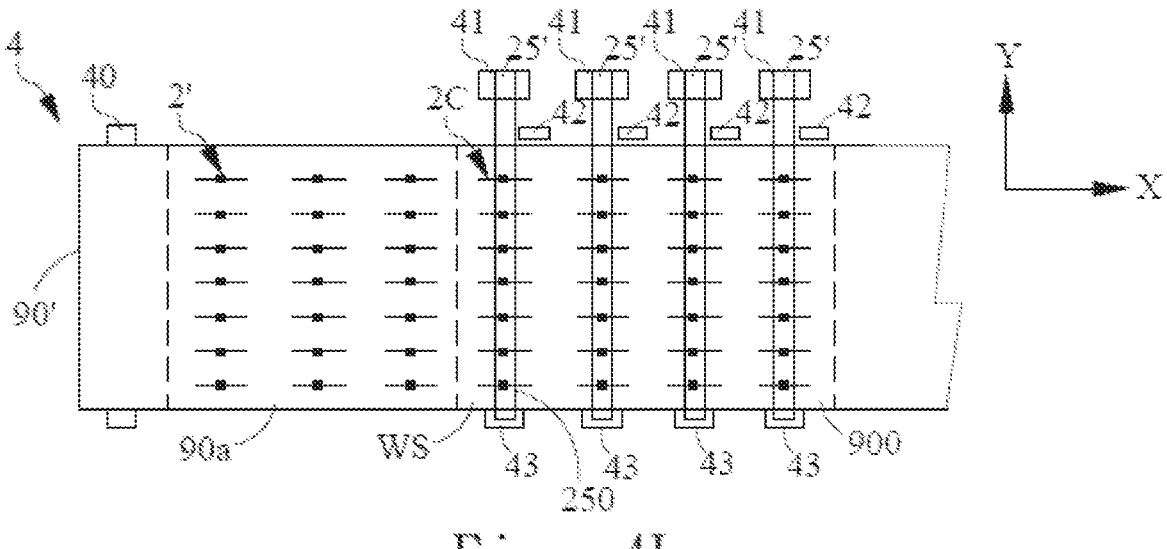
Figure 4N:
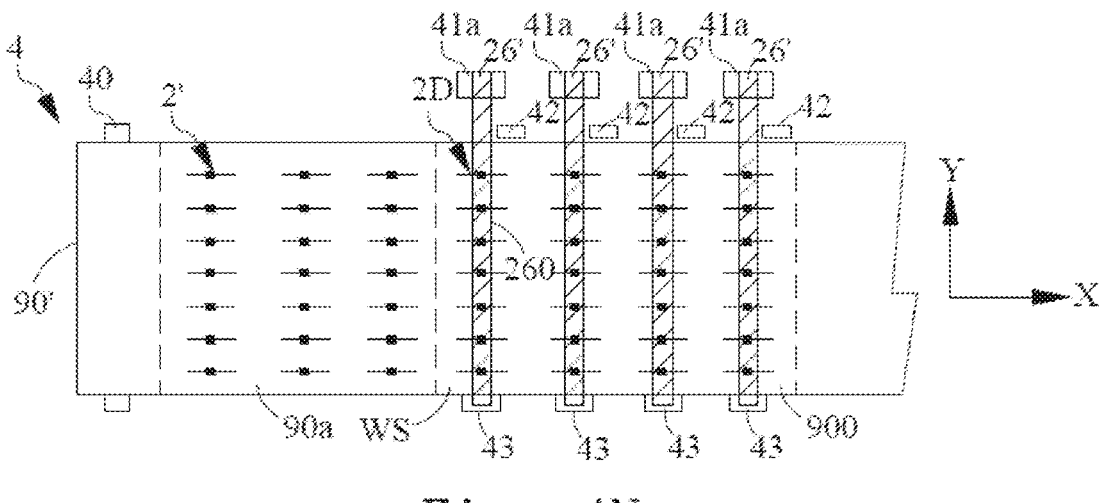
Figure 4O:
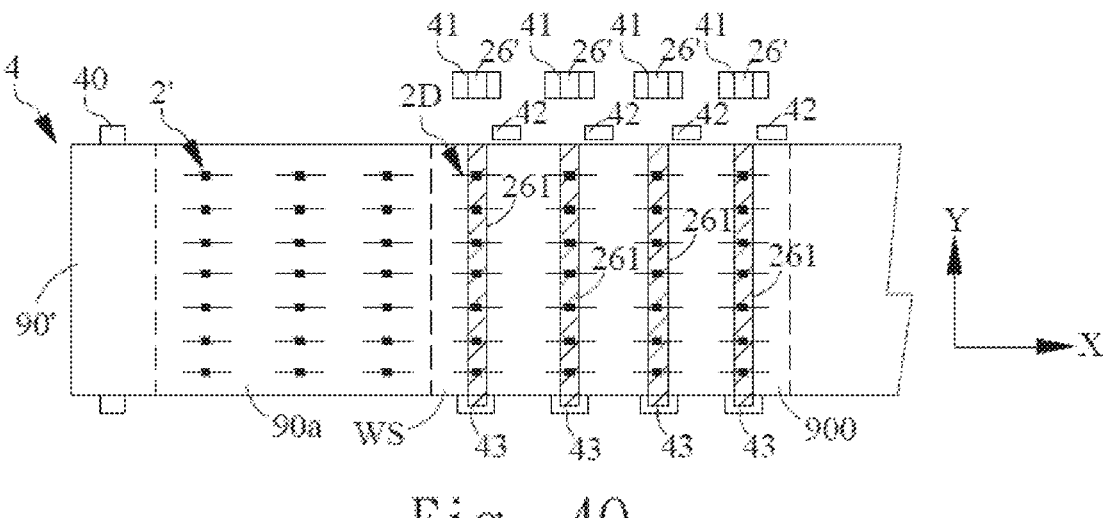
Figure 4P:
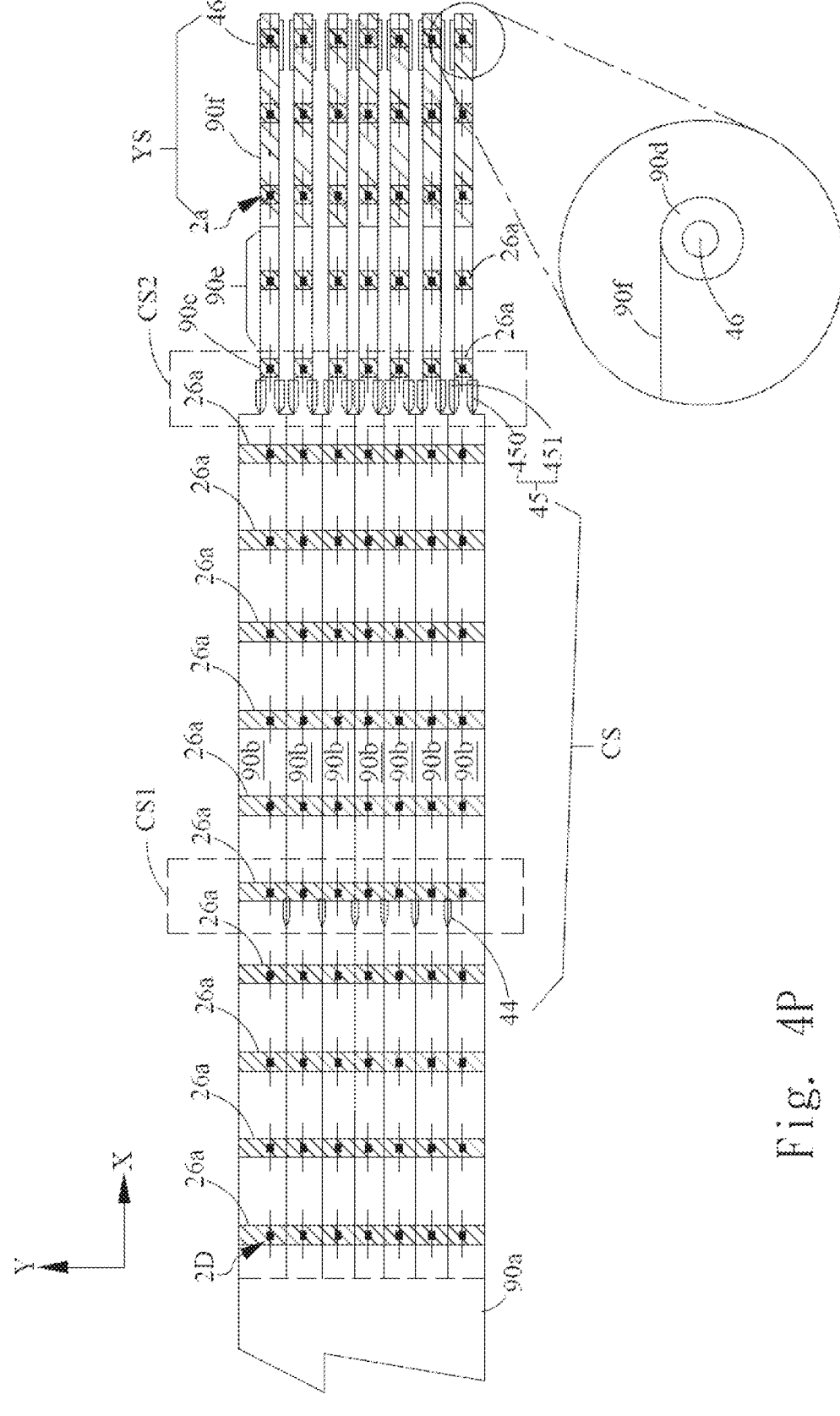
Figure 5B:
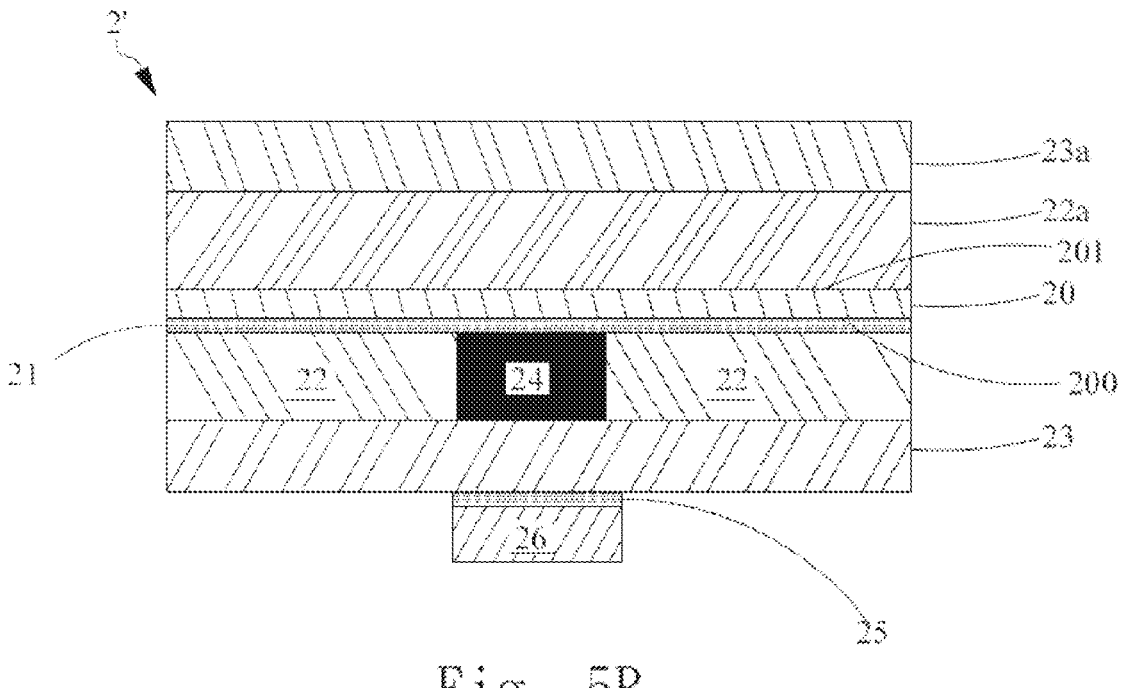
Figure 5C:
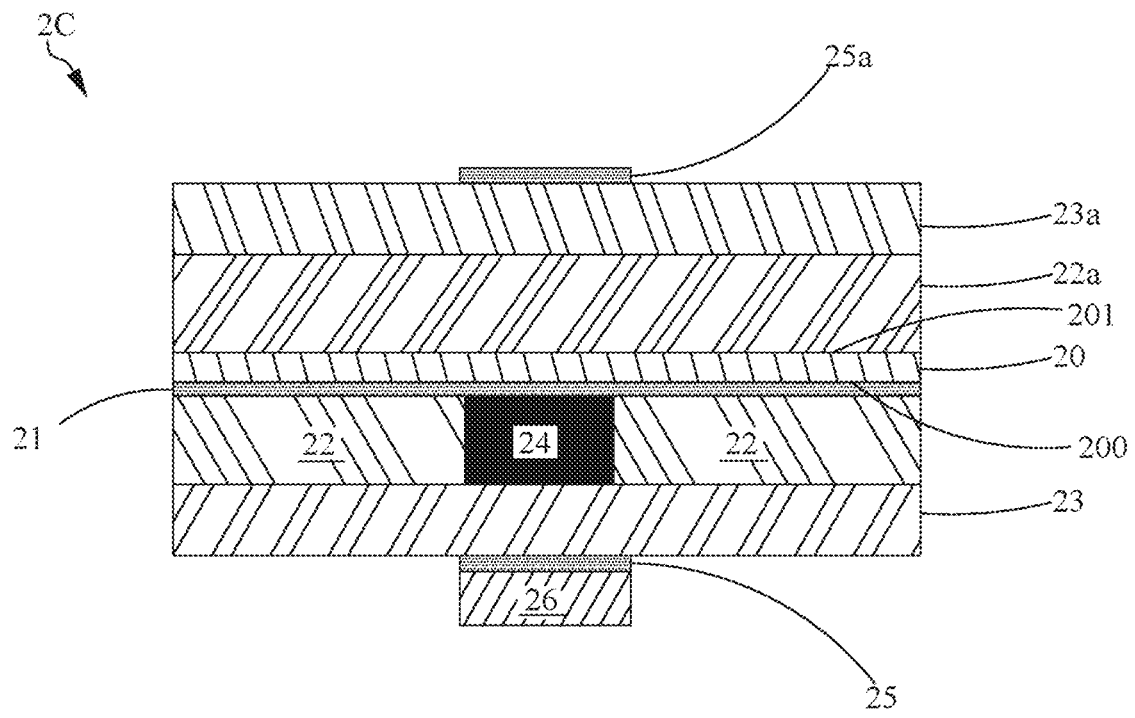
Figure 5D:
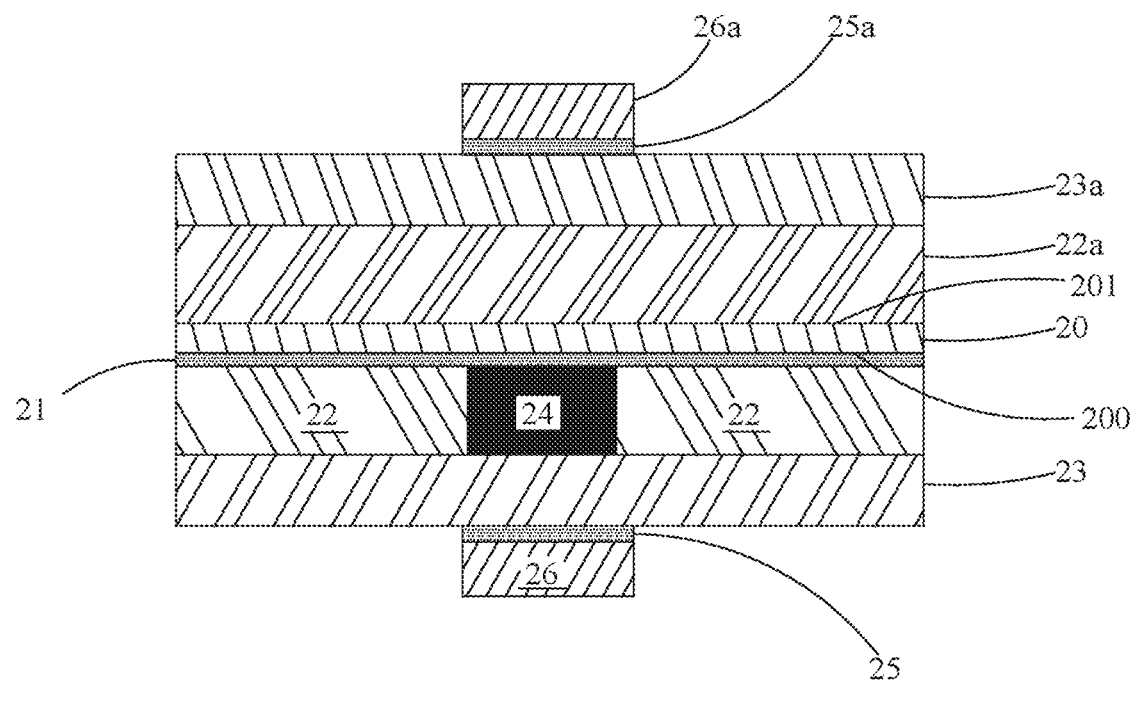

Alternatively, in another embodiment for forming the RFID yarn module 2a shown in FIG. 2, the steps shown in FIG. 4A, FIGS. 4C~4D and subsequently followed by FIGS. 4F~4G is the same as previously described flow. After the step shown in FIG. 4G, the material band 90a are rolled to form a semi-finished material roll 90' and move to the stage shown in FIG. 4K, in which the semi-finished RFID yarn module 2' is illustrated as FIG. 5B. After step shown in FIG. 4K, the steps shown in FIGS. 4L~4M are performed to the semi-finished RFID yarn module 2C as shown in FIG. 5C having the fourth adhesive layer 25a formed on the second polymer layer 23a. Thereafter, the steps shown FIGS. 4N~4O are proceeded to form the semi-finished RFID yarn module 2D as shown in FIG. 5D having the second protection layer 26a formed on the fourth adhesive layer 25a. After that the steps shown in FIG. 4P is processed to form a quantity N of the RFID tag rolls 90d, each of which contains a plurality of sequentially arranged RFID yarn module 2a shown in FIG. 2.

While the present invention has been particularly shown and described with reference to a preferred embodiment, it will be understood by those skilled in the art that various changes in form and detail may be without departing from the spirit and scope of the present invention.

What is claimed is:
1. A method for forming an RFID yarn module, comprising steps of:
   providing a roll-to-roll equipment having a material roll arranged thereon, wherein the material roll comprises a plurality of RFID tags two-dimensionally formed on the material roll, and each RFID tag comprises a polymer substrate having a first surface and a second surface opposite to the first surface, a metal layer formed on the first surface of the polymer substrate, an RFID element disposed on and electrically connected to the metal layer, a first adhesive layer formed on the metal layer, and a first polymer layer formed on the first adhesive layer and the RFID element;
   moving a material band segment having M×N RFID tags from the material roll to a processing station along a first direction;
   forming a quantity M of protection layers on the first polymer layer of the M×N RFID tags at the processing station wherein the quantity M of protection layers are formed along a second direction perpendicular to the first direction;

moving the material band segment having the quantity M of the protection layers to a cutting station; and cutting the material band segment having the quantity M of the protection layers along the first direction thereby forming a quantity N of RFID tag bands.

2. The method of claim 1, wherein the cutting station further comprises a first cutting stage and a second cutting stage, and step of cutting the material band segment further comprises steps of:

utilizing a quantity N–1 of first cutters for cutting the material band segment at the first cutting stage thereby forming a quantity N of first cutting segments respectively having a first width; and utilizing a quantity N–1 of second cutters for cutting the quantity N of first cutting segments at the second cutting stage thereby forming a quantity N of second cutting segments respectively having a second width.

3. The method of claim 2, further comprising, at a weaving station after the cutting station, weaving a fabric to wrap around each RFID tag band.

4. The method of claim 1, wherein the step for forming the protection layer further comprises steps of:

providing a quantity M of the protection material roll at a first lateral side of the material band segment at the processing station, wherein each protection material roll has a second adhesive layer formed thereon;

providing a clamping device;

clamping each free end of the quantity M of the protection material roll by the clamping device;

moving the clamping device along a second direction perpendicular to the first direction from the first lateral side to a second lateral side of the material band segment opposite the first lateral side, thereby forming a quantity M of protection material band segment corresponding to a location where the RFID elements are arranged;

using the second adhesive layer formed on the protection material band segment to adhere onto the first polymer layer; and cutting the protection material band segment along the first direction at the first lateral side thereby forming the quantity M of the protection layer.

5. The method of claim 1, wherein forming the protection layer further comprises steps of:

forming a second adhesive layer on the first polymer layer corresponding to the M×N RFID tags; and forming a quantity M of the protection layers on the second adhesive layer, wherein each protection layer is corresponding to a location where the RFID elements are arranged.

6. The method of claim 1, wherein the first adhesive layer is surrounding the RFID element or covered onto the RFID element.

* * * * *